W. E. CONROY.
MIRROR SUPPORT.
APPLICATION FILED FEB. 4, 1910.
987,346.
Patented Mar. 21, 1911.
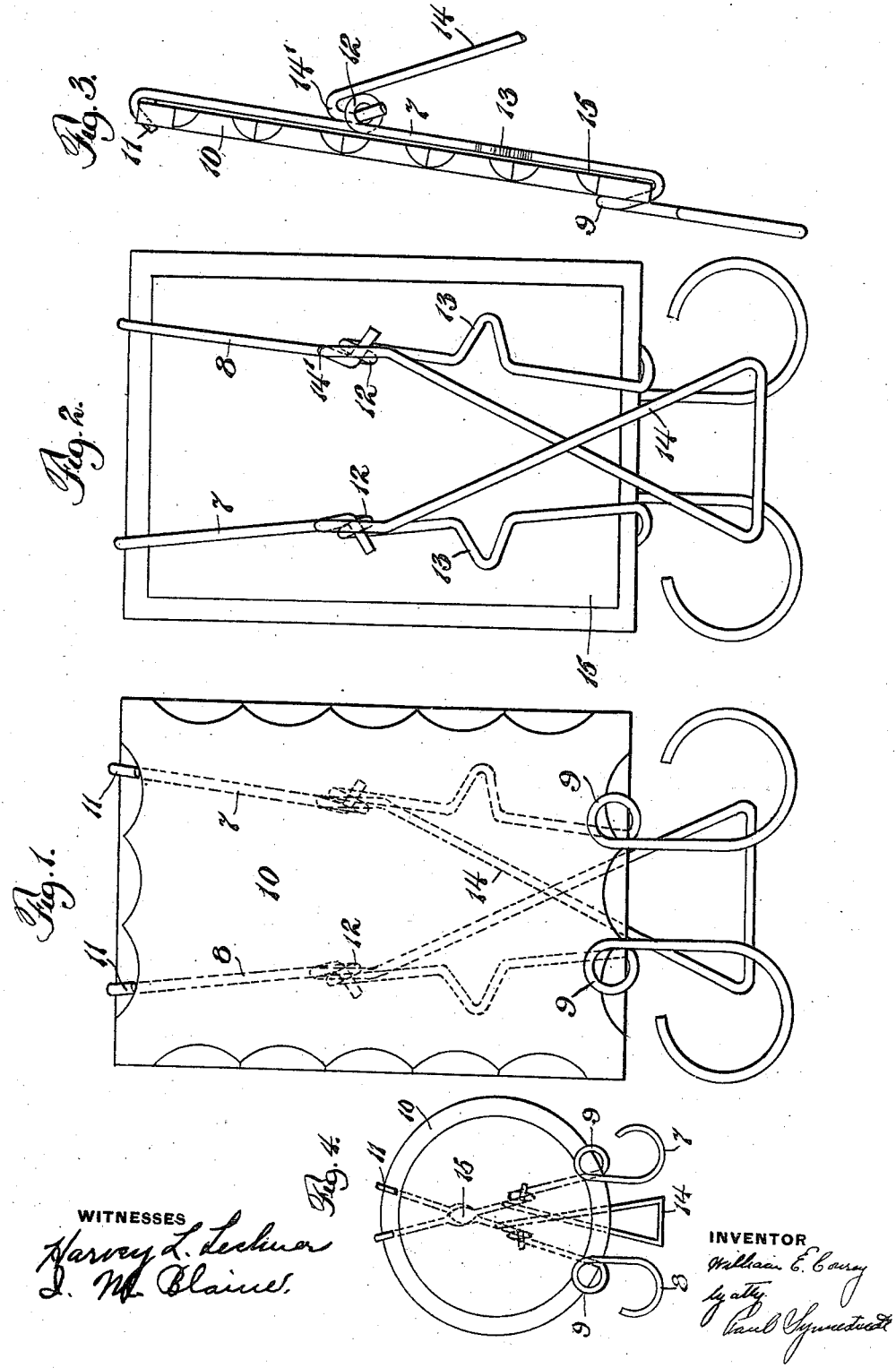
WITNESSES
INVENTOR

UNITED STATES PATENT OFFICE.

WILLIAM E. CONROY, OF PITTSBURG, PENNSYLVANIA.

MIRROR-SUPPORT.

987,346.  Specification of Letters Patent.  Patented Mar. 21, 1911.

Application filed February 4, 1910. Serial No. 542,003.

*To all whom it may concern:*

Be it known that I, WILLIAM E. CONROY, a citizen of the United States, residing at Pittsburg, in the county of Allegheny and State of Pennsylvania, have invented certain new and useful Improvements in Mirror-Supports, of which the following is a specification.

My invention has reference to mirrors and particularly to the means of supporting them, and it has for its primary objects; the provision of an improved mirror support, wherein the movement of the back-support is limited in an improved manner; and the provision of an improved support which can readily be attached to the mirror and which is simple and effective. These and such other objects as may hereinafter appear, which are incidental to my invention, I attain by means of a construction illustrated in preferred form in the accompanying drawings forming a part of this specification. In the drawings, Figure 1 is a front elevation of a mirror and support embodying my invention.

Figure 2 is a rear elevation of Figure 1,

Figure 3 is a side elevation thereof, and

Figure 4 is a view of my invention applied to a mirror of the circular type.

My invention is primarily designed to simplify and improve the mounting and action of the back-support, or back strut, of a mirror support, and to this end I provide a pair of wire standards or supports 7 and 8, each of which has a convolute portion 9 adapted to grasp the bottom edge of the mirror glass 10 and a portion 11 bent down over the upper edge thereof. The ends of the standards are bent in the manner indicated in the drawings to provide a suitable rest for the mirror. The standards 7 and 8 extend along the back of the mirror and are provided with loops or eyelets 12 to serve as a mounting for the back-support and with crimped or V shaped bends 13 to be hereinafter more particularly described. The back-support 14 is formed of an integral piece of wire bent into a cross form and has its ends pivotally mounted in the eyelets or loops 12 of the supporting standards 7 and 8. Immediately above the pivotal connection the ends of the back-support 14 are formed or bent into knuckle formations 14' which are adapted to bear against the standards 7 and 8 when the back-support is moved away from the mirror, in the manner indicated in Figure 3, and thus limit its movement. This arrangement has the further advantage that not only the mirror itself but also the covering or protecting plate 15 in the back thereof, are protected from any wearing action occasioned by the movement of the back-support when the mirror is handled. The particular configuration of the back-support is desirable because the ends of the support may be thereby readily inserted into the eyelets of the standards 7 and 8 by simply springing the said ends together. Upon insertion they are spring held in place, and an improved mounting for the back-support is thus secured.

On reference, particularly, to Figure 3 it will be noted that I have provided a covering or protecting plate 15 for protecting the silvered surface of the mirror against scratching, etc. This covering is held in position by the standards 7 and 8, and particularly by the V shaped bends 13, which may be sprung toward the mirror to afford a spring support for the covering, should the standards be inadequate. These bends 13 have an additional and important function in that they afford a convenient and effective means for securing and tightening the standards 7 and 8 to the mirror, it being necessary only to pinch or crimp the sides of the bends together thereby shortening the length of the standards. These and other advantages of my construction will readily be apparent to those skilled in the art.

Referring to Fig. 4 of the drawings it will be seen that the standards 7 and 8 cross one another, and are flattened, or have flattened portions 15, where they cross, so that the standards will not stand out too far from the back of the mirror. The construction in other respects is similar to that of Fig. 1.

Having thus described my invention and illustrated its use, what I claim as new and desire to secure by Letters Patent is the following:—

1. A wire support for mirrors comprising in combination a pair of independent glass supporting members extending on the back of the mirror and yieldingly gripping the opposite ends thereof, an integral back-support having its ends pivoted in said loops, and stop means in the back-support adjacent the loops and adapted to bear against the glass supporting members limiting the movement of the back support away from the mirror.

2. A wire support for mirrors comprising in combination a pair of glass supporting members extending along the back of the mirror, a loop in each of said members, an integral back-support vent into the form of a cross and having its ends pivoted in the loops from within and spring held in position, and stop means on the back support immediately above the points of pivotal connection adapted to bear against the glass supporting members limiting the movement of the back-support away from the mirror.

3. The combination with a spring wire mirror bracket provided with a pair of loops, of a supporting brace therefor comprising a wire member having a pair of loops at its upper ends with laterally turned extremities extending through the first mentioned loops, the loops on the said brace member being arranged so as to engage the wire bracket and so limit the tilting of the brace member, and the said loops on the brace member lying to the inside of the loops on the bracket and being pressed yieldingly outward.

In testimony whereof I have hereunto signed my name in the presence of the two subscribing witnesses.

WM. E. CONROY.

Witnesses:
PAUL SYNNESTVEDT,
JOHN WHITE.

---

Copies of this patent may be obtained for five cents each, by addressing the "Commissioner of Patents, Washington, D. C."